United States Patent [19]
Palecek et al.

[11] Patent Number: 5,343,547
[45] Date of Patent: Aug. 30, 1994

[54] OVERCONNECTOR ASSEMBLY

[76] Inventors: Vincent J. Palecek, 3036 S. Forrest Ave., Brookfield, Ill. 60513; James W. McGinley, 105 N. Summit Dr., Schaumburg, Ill. 60194; Philip W. Schofield, 1218 W. Euclid Ave., Oak Park, Ill. 60302

[21] Appl. No.: 57,696
[22] Filed: May 4, 1993
[51] Int. Cl.⁵ .................... G02B 6/00; G02B 6/36
[52] U.S. Cl. ...................................... 375/76
[58] Field of Search .............. 385/53, 55, 56, 76, 385/77

[56] References Cited
U.S. PATENT DOCUMENTS 4,953,929  9/1990  Basista et al. ..................... 385/53
5,073,042 12/1991  Mulholland et al. ............ 385/56 X
5,123,071  6/1992  Mulholland et al. ............... 385/53

*Primary Examiner*—Akm E. Ullah
*Attorney, Agent, or Firm*—David L. Newman

[57] ABSTRACT

An overconnector assembly having a pair of half sections which can be interlocked to form a generally rectangular collar for mounting a pair of simplex connector housing portions one above the other within the collar, at least one of the half sections having a perpendicularly extending post intermediate the ends thereof and projecting toward the other half section to separate a pair of connector housings mounted within said collar, the post being dimensioned to permit a controlled amount of pivotal movement between the connector housing portions.

10 Claims, 1 Drawing Sheet

OVERCONNECTOR ASSEMBLY

BACKGROUND OF THE INVENTION

The present invention relates to optical fiber connectors for optical communication applications, and more particularly to an overconnector for a pair of push-pull coupling type optical fiber connectors permitting simultaneous coupling and of uncoupling manipulation of a connector pair.

Fiber optic connectors are known in the art such as Mulholland, et al., U.S. Pat. No. 5,123,071, which describes an overconnector assembly for converting a pair of simplex connectors of the push-pull coupling type into a duplex connector of the push-pull coupling type. The overconnector assembly comprises a bipartite structure of complementary parts which have a double complementary interior each which has a compartment having a precisely shaped profile conforming to the shape of the defined exterior profile of each of the pair of simplex optical fiber connectors. The patent discloses three depending walls defining a double compartment interior. The patent further discloses means for snap-fitting the two parts together at each end and a center wall in between which has no interlocking means.

Various kinds of optical fiber connectors are known for connecting two optical fibers and/or an optical fiber and an optical component. Other types of connectors between adaptors and plugs are known, including bayonet locks and the push-pull coupling type. Also known are duplex type connectors in which a permanent housing provides two alignment sleeves and two ferrules to permanently encompass two optical fibers of the push-pull coupling type.

The above Mulholland et al. patent defines an overconnector assembly having within the interior of each compartment a precisely shaped profile conforming to the shape of the defined exterior profile of each of the pair of simplex optical connectors. Upon connection of the overconnector, these simplex optical fiber connectors are tightly confined within the overconnector assembly, restricting the connectors from any type of movement. This rigid coupling is unsatisfactory in that it makes it difficult to insert the pair of connectors into receptacles having slightly varying insertion angles and spacing.

Basista et al., U.S. Pat. No. 4,953,929, disclose an overconnector assembly having two clamping portions for each connector interconnected by a resilient portion having an S-shaped configuration to allow freedom of movement between the two sides to accommodate for manufacturing tolerances upon insertion into a duplex receptacle. These clamp members have tabs which must be matingly positioned to slots on the upper and lower surfaces of the simplex connector. Such slots are not present on all simplex connectors and are not present on the customary push-pull type of connectors. This configuration also requires a separation distance in the center between the two clamping portions which is large in order to accommodate the interconnecting S-shaped resilient member, which may also make this overconnector assembly non-insertable into common duplex receptacles.

By this invention, an overconnector assembly for a pair of simplex optical fiber connectors is provided which allows the simplex optical fiber connectors to have limited movement relative to the overconnector after assembly of the overconnector and pair of fiber connectors in order to allow easy mating with an adaptor and allow coupling of standard simplex connectors without requiring a special tab or slots upon the simplex connector body. In addition, the present invention provides a third mating member which adds to the stability of the overconnector assembly.

In order to overcome the deficiencies of the prior art devices, it is another object of the present invention to provide a new and improved overconnector assembly which is easily manufactured and is easily assembled in the field.

It is another objective of the present invention to provide a new and improved overconnector assembly which allows for limited axial movement of the simplex optical fiber connectors relative to the overconnector upon assembly.

It is a further object of this invention to provide a new and improved overconnector assembly which provides an effective means for joining two optical fiber connectors into a duplex connector.

SUMMARY OF THE INVENTION

In accordance with these and other objects, the present invention provides a new and improved overconnector assembly of the push-pull coupling type featuring a structure that is particularly advantageous in converting a pair of simplex connectors of push-pull coupling type into a duplex connector of the push-pull coupling type. The overconnector assembly comprises a pair of simplex optical fiber connectors that operates as a duplex connector. The overconnector assembly comprises a bipartite structure of complementary parts, each of which has a common base having two depending walls, one at each end, defining a single compartment interior. The compartment is bisected by a pair of posts protruding from the base at a point midway between the two walls. Each wall of the overconnector assembly further has a female snap catch located at one outer depending wall and a projection with a beveled surface located at an opposite outer depending wall. The two complimentary parts fit together to form the overconnector assembly of the present invention.

It is particularly an advantage of the present invention that the double compartments which result from the connection of the two sides of the overconnector assembly, do not form a precisely shaped interior but, via the cylindrical posts at the center of the overconnector assembly, form a loose-fitting interior. The simplex optical connectors contact the surfaces of the cylindrical posts only along linear rather than planar surfaces and therefore, while restricted axially, may move pivotally in order to allow for easy insertion into a receptacle.

In accordance with the preferred embodiment, the cylindrical posts have on one side of a connector assembly a female end and a male end which mate with their respective parts of the opposite overconnector assembly in order to provide an engagement point at the center of the overconnector assembly.

The foregoing and other objects and advantages of our invention will be apparent from the following description of a preferred embodiment thereof, taken in conjunction with the accompanying drawings.

Now, in order to acquaint those skilled in the art with the manner of making and using our invention, there will be described, in conjunction with the accompanying drawings, a preferred embodiment thereof.

DESCRIPTION OF THE PREFERRED EMBODIMENT

Figure 1:
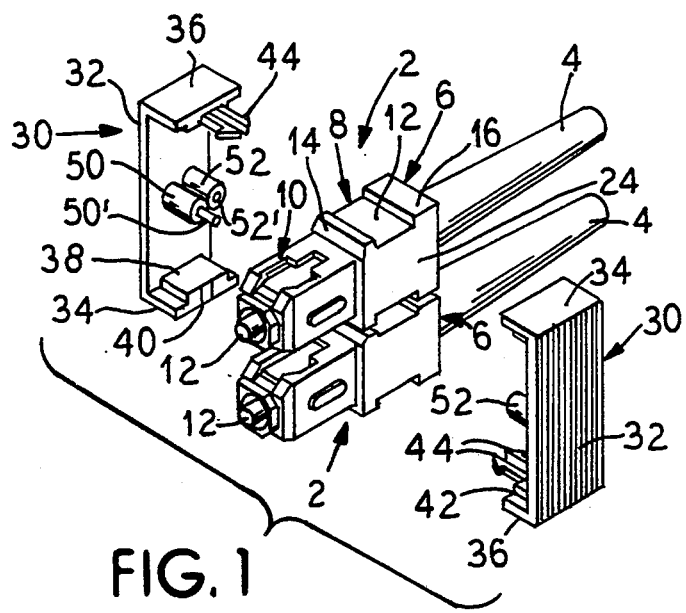
FIG. 1 is a perspective view of push-pull coupling plugs or connectors and a pair of overconnector components partially exploded to show the fit of one of the overconnector components.

Referring now to the drawings, FIG. 1 shows a pair of simplex connectors 2. Because the simplex connectors are identical, the same reference numerals will be used to describe the components thereof. Each such connector 2 has a strain relief boot 4 extending from one end thereof for encompassing a length of fiber optic cable (not shown). Each simplex connector 2 includes a plug housing 6 having a rearward section 8 and a forward section 10, and a fiber optic alignment ferrule 12 is shown projecting axially from the forward section 10.

Figure 4:
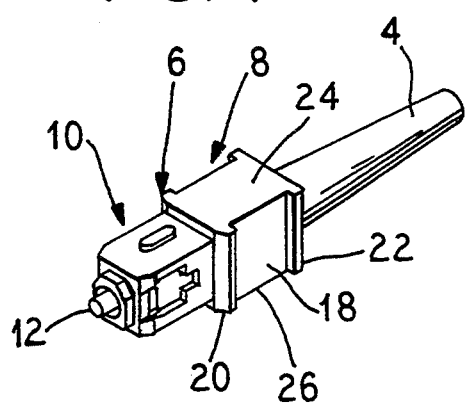
FIG. 4 is a perspective view of one of the coupling plugs.

The rearward section 8 of the plug housing 6 includes a flat upper surface 12 located between a pair of parallel ridge portions 14 and 16. The underside of the rearward section 8 is identical to the top portion and includes a flat bottom surface 18 which is located between a pair of parallel ridge portions 20 and 22 (see FIG. 4). The rearward section 8 further includes opposed, flat side surfaces as shown at 24 and 26.

An improved overconnector is provided for combining the two simplex connectors 2 in order to form a duplex connector. As shown in FIG. 1, the overconnector comprises a pair of half sections 30 which are identical to one another and thus will be described using the same reference numerals. Each overconnector half section 30 includes a base wall 32 and parallel end walls 34 and 36 which extend perpendicularly from the base wall 32 at opposite ends thereof.

Figure 2:
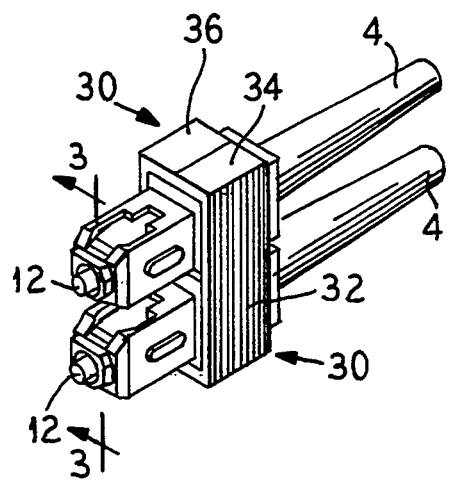
FIG. 2 is a perspective view of an overconnector assembly assembled to join two simple push-pull coupling plugs.

The end wall 34 includes a thickened portion 38 (see FIG. 1) in which is formed a female latch receptacle 40, and the end wall 36 incudes a thickened portion 42 having a pair of male latch members 44 projecting therefrom. As shown in FIG. 1, the overconnector half sections 30 are inverted relative to one another so when they are engaged together to encompass and hold the two simplex connectors 2 as shown in FIG. 2, the male latch members 44 on each overconnector half section 30 will enter and latch in the corresponding female latch receptacle 40 on the opposed overconnector half section 30. In the foregoing manner, the two overconnector half sections 30 are interlocked so as to support and maintain the two simplex connectors 2 in relation to one another to form a duplex connector as shown in FIG. 2.

An important feature of the present invention concerns a pair of cylindrical posts 50 and 52 which are of equal diameter and are formed to project perpendicularly from the base 32. The posts 50 and 52 are located side-by-side in slightly spaced relation to one another, and they are each equally spaced between and parallel to the end walls 34 and 36. The projecting posts 50 and 52 are identical except that the post 50 has a small diameter centrally located projecting post 50', and the other post 52 has a centrally located round hole 52' dimensioned to receive the small diameter projecting post 50' when the two overconnector half sections 30 are interconnected in the manner shown in FIG. 2. As a result, the small diameter projecting post 50' and the round hole 52' on each half section 30 cooperate with a corresponding post 50' and hole 52' on the other overconnector half section 30 to serve a locating function when the half sections 30 are interconnected.

Figure 3:
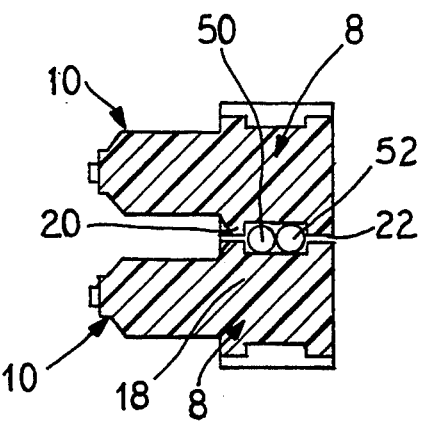
FIG. 3 is a vertical sectional view of the overconnector assembly taken generally along the line 3—3 of FIG. 2.

A further important feature of the present invention concerns the manner in which the pair of cylindrical posts 50 and 52 on each overconnector half section 30 cooperate with adjacent surfaces on the two plug housings 6 so as to effect a controlled but loose relationship between the two simplex connectors. More specifically, as best shown in FIG. 3, the two posts 50 and 52 separate the rearward sections 8 of the plug housings 6 so they do not contact one another. The bottom surface 18 of the upper rearward section 8 rests directly on the tops of the two posts 50 and 52. Similarly, the upper surface 12 of the lower rearward section 8 bears against the underside of the two posts 50 and 52. Furthermore, the posts are dimensioned to be sufficiently large that the downwardly projecting ridges 20 and 22 on the underside of the upper section 8 do not engage the upwardly projecting ridges 14 and 16 of the lower section 8.

The result of the foregoing is that the two rearward sections 8 of the two plug housings 6 in effect float on the two posts 50 and 52. Neither of those two rearward sections 8 is in direct contact with one another due to the spacing effected by the posts 50 and 52 and the posts 50 and 52 permit the two forward sections 10 of the two plug housings 6 to pivot up and down vertically a limited amount as shown in any of FIGS. 1-4. Such a self-adjusting ability for vertical movement is quite advantageous when the assembled duplex connector is plugged into a female adaptor or receptacle to effect connection to another duplex fiber optic connector.

The foregoing structure offers a significant advantage over an overconnector device where a third or middle flat wall extends from the base 32 rather than one or more posts in accordance with the present invention. Where a flat wall is provided as in U.S. Pat. No. 5,123,071, the overconnector defines two compartments which precisely conform to the exterior profile of the rear sections 8 of the plug housings 6. As a result, the two plug housings are held in a relatively rigid manner by the overconnector assembly, and little or no self-adjustment is permitted when the duplex assembly is plugged into a mating receptacle.

In accordance with the present invention, a limited amount of rocking or pivotal movement is permitted between the two simplex connectors, particularly relative vertical movement of the forward sections 10 of the plug housings 6. The amount of such relative vertical movement can be controlled by controlling the diameter of the posts 50 and 52, i.e., the larger the diameter of those posts, the more space there is between the rear sections 8 of the plug housings 6, and thus the more relative pivotal movement that is permitted.

In accordance with one embodiment of the present invention, a single post may be utilized rather than the pair of posts 50 and 52. Additional pivotal movement can be achieved by using only a single post, whereas use of a pair of closely spaced posts aids in maintaining a generally parallel relationship between the two simplex connectors.

With respect to the male and female ends of the posts 50 and 52, the fact that the post ends interlock with one another serves to more effectively interlock the two overconnector half sections 30 with one another when they are interconnected as shown in FIG. 2.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An overconnector assembly for mounting a pair of simplex connectors to form a duplex connector comprising, in combination, a pair of overconnector half sections, each half section including a base and a pair of perpendicularly extending walls, one at each end of said base, each of said half sections having latching means thereon so said half sections are interconnectable for mounting a pair of simplex connector housing portions in side-by-side orientation, and at least one post equally spaced from said walls and extending perpendicularly from a first overconnector half section base toward a second overconnector half section base to separate said connector housing portions and control the spacing therebetween, said post being dimensioned to permit pivotal movement between said connector housing portions.

2. An overconnector assembly as defined in claim 1 where each of said half sections has a post equally spaced from said walls and extending perpendicularly from one of said bases toward the other base.

3. An overconnector assembly as defined in claim 2 where the post on one of said bases is coaxial with the post on the other of said bases.

4. An over connector assembly as defined in claim 3 wherein male latch members and female receptacle members are provided so that when said half sections are interlocked with one another to form said generally rectangular collar, the respective ends of the male latch members and the female receptacle members also interlock with one another.

5. An overconnector assembly as defined in claim 1 where two posts extend perpendicularly from each of said bases, said two posts being equally spaced from said walls and extending toward the other base to separate said connector housing portions, the two posts extending from one of said bases being coaxial with corresponding posts extending from the other of said bases.

6. An overconnector assembly as defined in claim 5, where the two posts extending from each of said bases are slightly spaced from one another, said spacing being controlled to control the amount of relative pivotal movement permitted between said duplex connectors.

7. An overconnector assembly for converting a pair of simplex connectors to a duplex connector, comprising an overconnector assembly forming double compartments, said compartments enclosing a pair of simplex connectors, both simplex connectors in side-by-side orientation separated in said overconnector assembly by a pair of posts, each of said pair of simplex connectors encompassed within said overconnector assembly by outer walls, said outer walls having a latching means, said outer walls acting in combination with said posts to limit axial movement of said connectors, said posts being dimensioned to permit of pivotal movement between said simplex connectors.

8. An overconnector assembly as defined in claim 7 where said latching means comprises a detente extending from said walls to correspondingly engage a notch.

9. An overconnector assembly as defined in claim 8 where said overconnector assembly comprises a pair of overconnector half sections.

10. An overconnector assembly as defined in claim 9 where said overconnector half sections are hermaphroditic.

* * * * *